United States Patent [19]
Ishikawa et al.

[11] Patent Number: 5,600,455
[45] Date of Patent: Feb. 4, 1997

[54] PRISMATIC MEMBER WITH COARSENED PORTIONS OR TRIANGULAR PRISMATIC AND SEMI-CIRCULAR PRISMATIC MEMBERS ARRANGED ON A FLAT LIGHT EMITTING SURFACE

[75] Inventors: Tsuyoshi Ishikawa, Tokyo; Kayoko Watai, Hasuda; Kazuaki Yokoyama, Ageo, all of Japan

[73] Assignee: Enplas Corporation, Saitama-ken, Japan

[21] Appl. No.: 297,956

[22] Filed: Aug. 31, 1994

[51] Int. Cl.⁶ .................. G02F 1/1335; G01D 11/28; F21V 7/04; F21V 5/00
[52] U.S. Cl. ................ 349/57; 362/27; 362/31; 362/331; 349/64; 349/65
[58] Field of Search .................. 359/40, 41, 48, 359/49, 69; 362/26, 31, 330, 339, 27, 331; 385/901

[56] References Cited

U.S. PATENT DOCUMENTS

| | | | |
|---|---|---|---|
| 4,298,249 | 11/1981 | Gloor et al. | 359/69 |
| 4,765,701 | 8/1988 | Cheslak | 362/26 |
| 4,975,807 | 12/1990 | Ohashi | 362/26 |
| 5,262,880 | 11/1993 | Abileah | 359/69 |
| 5,394,255 | 2/1995 | Yokota et al. | 359/69 |
| 5,408,388 | 4/1995 | Kobayashi et al. | 362/31 |
| 5,442,523 | 8/1995 | Kashima et al. | 362/339 |

FOREIGN PATENT DOCUMENTS

| | | | |
|---|---|---|---|
| 510063 | 10/1930 | Germany | 362/339 |
| 5-33129 | 4/1993 | Japan . | |

Primary Examiner—Anita Pellman Gross
Assistant Examiner—Walter J. Malinowski
Attorney, Agent, or Firm—Finnegan, Henderson, Farabow, Garrett & Dunner L.L.P.

[57] ABSTRACT

A transparent member having a multiplicity of prism-like convex portions which are aligned in parallel to each other and formed on at least one of surfaces of the member; the member is used to be disposed between a light emitting surface side of a surface light source device and a liquid crystal display device; and by using the member, it is possible to illuminate the liquid crystal display device in a bright and uniform manner and to prevent that any stripe pattern is appeared.

7 Claims, 4 Drawing Sheets

PRISMATIC MEMBER WITH COARSENED PORTIONS OR TRIANGULAR PRISMATIC AND SEMI-CIRCULAR PRISMATIC MEMBERS ARRANGED ON A FLAT LIGHT EMITTING SURFACE

BACKGROUND OF THE INVENTION a) Field of the Invention

The present invention relates to a plate-like or sheet-like transparent member which is used to be disposed on a light emitting surface side of a surface light source device. Particularly, the present invention relates to a transparent member having a multiplicity of prism-like portions on one of surfaces thereof.

b) Description of the Prior Art

The transparent material according to the present invention is in a surface light source device, which is for use in a back light of liquid crystal display units. FIG. 1 is a schematic view showing a construction of a conventional surface light source device which has a light conducting member. In the surface light source device shown in FIG. 1, the numerical reference 5 represents a linear light source, 6 a light conducting member made of transparent material having a plate-like shape, 7 a diffusing plate, 8 represents a reflective member. In this surface light source device, a light emitted from the light source 5 is made incident upon an edge surface 6a of the light conducting member 6 and directed inside the member to be transmitted to the center portion thereof. A part of light being transmitted inside the light conducting member 6 is diffused by a multiplicity of fine diffusion portions 9 which are provided on a surface 6c of the light conducting member 6, and then emitted from the light emitting surface 6b thereof. The emitting light emitted from the light emitting surface 6b then passes through the diffusion plate 7 to become a diffusion light having an almost uniform brightness distribution for illuminating a liquid crystal display panel 4.

In this device, the diffusion light diffused by the diffusion plate 7 is directed in all directions. Therefore, there is some waste light which is not directed toward the liquid crystal display panel 4. Such waste light is not useful for illuminating the liquid crystal display panel 4 and thus a bright surface light source cannot be obtained.

In order to remove the drawback, there is arranged a transparent member 1 having a multiplicity of prism-like portions formed on one of the surfaces thereof between the diffusion plate 6 and the liquid crystal display panel 4 in the conventional surface light source device. By the transparent member 1, the light directed toward outside the liquid crystal display panel 4 is collected on the liquid crystal display panel 4 as much as possible to provide a bright surface light source.

The transparent member 1 has such a cross-sectional shape as shown in FIG. 3 that a multiplicity of triangles 10 are aligned to be formed on one of the surfaces thereof; and top lines of the triangle portions are arranged to be parallel to each other, as shown in a plan view of FIG. 2.

In FIG. 4, is shown another conventional transparent member, in which a multiplicity of conical or poligonal pyramid-shaped portions 104 are provided on one of the surfaces thereof in a crosswise manner. When disposing this transparent member between the surface light source device and the liquid crystal display panel as shown in FIG. 1, such trouble sometimes happens that a direction 1a along which the top lines of the triangle portions are extended or directions along which top portions of the conical or polgonal pyramid-shapes portions are aligned is or are lies upon bus lines of the liquid crystal display panel 4, and a stripe pattern as Moire, which is not desired, is generated.

Further, when the above-explained transparent member (shown in FIGS. 2 and 3) is disposed between the surface light source device and the liquid crystal display panel, most of the diffused light is directed in a perpendicular or almost perpendicular direction with respect to the liquid crystal display panel. Therefore, when observation is achieved from the direction being perpendicular with respect to the liquid crystal display panel, a desired bright image can be obtained, but when observation is from a perspective direction with respect to the liquid crystal display panel, the image becomes so dark that an observer can scarcely see the image.

In order to solve this drawback, still another conventional transparent member, which is as shown in FIG. 5, is suggested. In this member, the top portions 10a of the prisms 10B are arranged to be round; and most of the diffused light which has been passed through the diffusion plate 7 is directed toward the liquid crystal display panel 4 thereby to obtain a bright illumination. Since a part of the diffused light is proceeded in a perspective direction with respect to the liquid crystal display panel 4, the observation of the liquid crystal display panel from the perspective direction can be also carried out. However, there is still remained some light directed outside the liquid crystal display panel, which cannot be used for illuminating the panel; and then some loss of the amount of light is caused.

SUMMARY OF THE INVENTION

The present invention has for its object to provide a transparent member, which is used to be disposed on a light emitting surface side of a surface light source device, in which a multiplicity of prism-like portions are formed on one of surfaces thereof and surfaces of the prism-like portions are arranged to be coarsened.

The present invention has for its another object to provide a transparent member unit, which is used to be disposed on a light emitting surface side of a surface light source device, which comprises two transparent members each having a multiplicity of prism-like portions on every one of surfaces thereof; and the members which are arranged such that the prism-like portions have triangle shaped cross sections are aligned to be parallel to each other, and longitudinal directions of the prism-like portions of these members intersect each other.

DETAILED DESCRIPTION OF THE PREFERRED EMBODIMENTS

Figure 6:
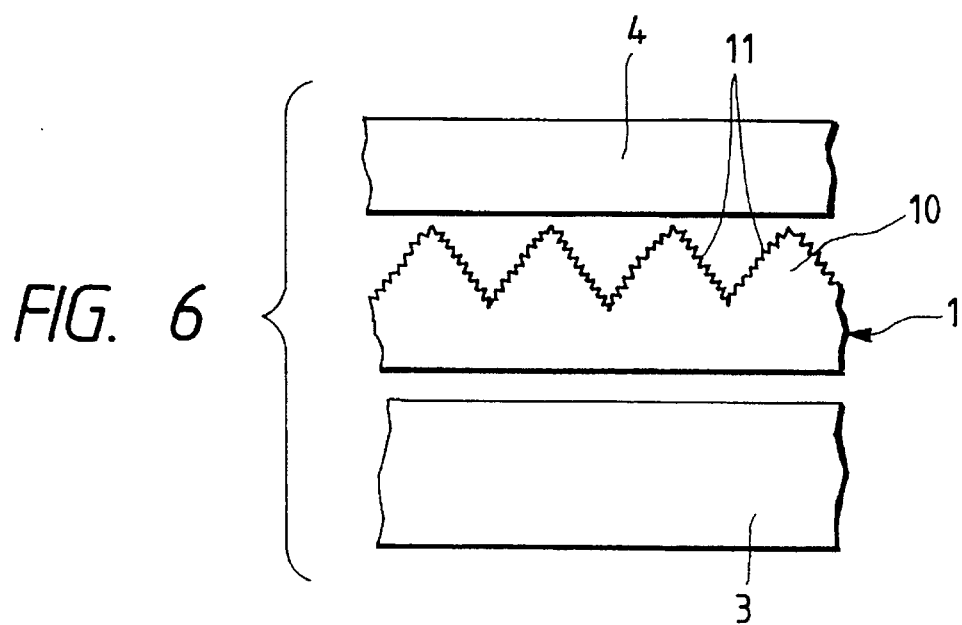
FIGS. 6 to 9 are cross-sectional views showing first to fourth embodiments of transparent members according to the present invention.

FIG. 6 is a schematic view showing a first embodiment of a transparent member according to the invention, which is used in a surface light source device. In FIG. 6, a part of the transparent member and a surface light source device is depicted in an enlarged scale.

In FIG. 6, the numerical reference 1 represents a transparent member according to the present invention, which is disposed on a light emitting surface side of the surface light source device 3; and the numerical reference 4 represents a liquid crystal display panel. It should be noted that the surface light source device 3 corresponds to the device 3 shown in FIG. 1.

The transparent member 1 comprises a multiplicity of prism-like convex portions 10 formed on one of the surfaces of the member 1 as shown in FIG. 6. And the surfaces of the convex portions 10 are arranged as coarse surfaces 11.

Figure 2:
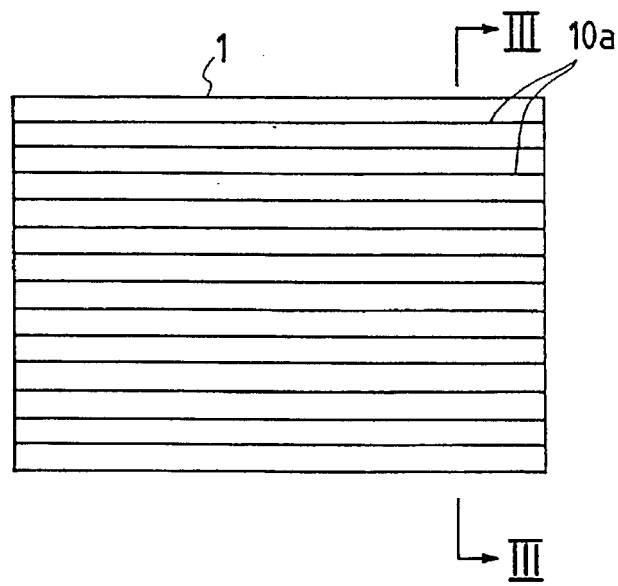
FIG. 2 is a plan view depicting a conventional prism sheet.
Figure 3:
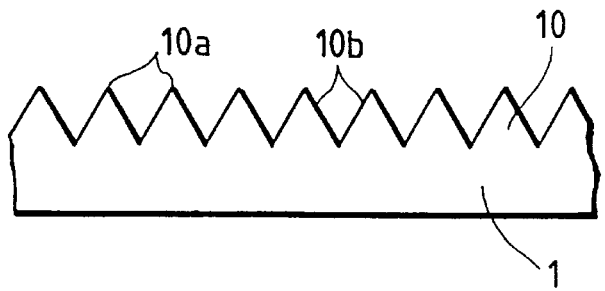
FIG. 3 is a cross-sectional view cutting the prism sheet depicted in FIG. 2 along III—III line.
Figure 4:
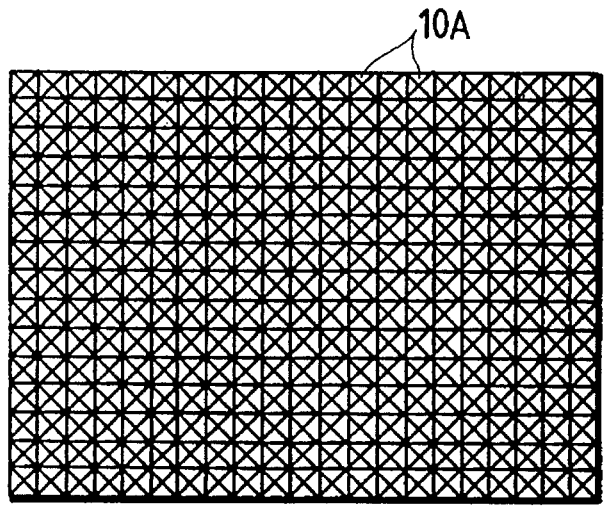
FIG. 4 is a plan view illustrating another conventional prism sheet.
Figure 5:
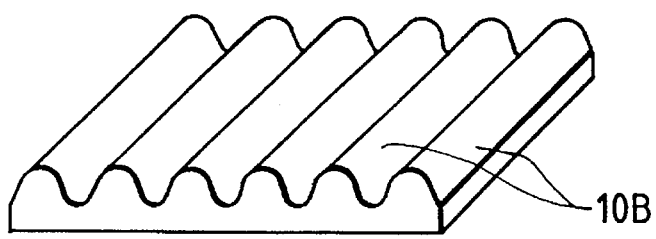
FIG. 5 is a perspective view representing another conventional prism sheet.

In this embodiment, by forming the coarse surfaces 11 on the surfaces of the convex portions 10, no stripe pattern like Moire is appeared without regard to the relation between the longitudinal direction of the convex portions 10 (direction shown by the numerical reference 10a in FIG. 2) and an extending direction of the bus lines of the liquid crystal display panel 4. It is desired that the coarse ratio of the coarsened surfaces 11 (surface coarse ratio) formed on the surfaces 10b of the convex portions 10 is 10 micrometers or less. Additionally, it is further desired that the distance between each convex portion 10 formed on the transparent material 1 is 0.1 mm or less.

Figure 7:
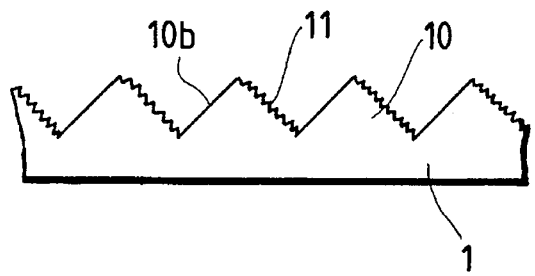

FIG. 7 is a schematic view showing a second embodiment of the transparent member according to the present invention. In this embodiment, only one of inclined surfaces of every convex portion, which has a triangle cross section, formed on the transparent member 1 is arranged as a coarse surface.

Figure 8:
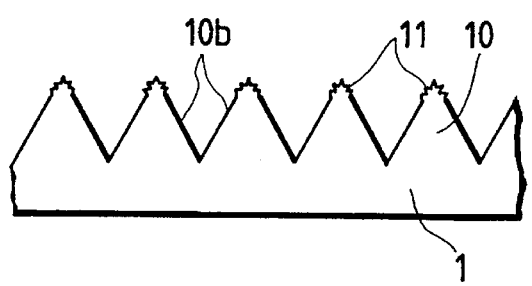

FIG. 8 is a schematic view illustrating a third embodiment of the transparent member according to the present invention. In the third embodiment, only a portion in the vicinity of the top portion of every prism-like convex portion 10 formed on the transparent member 1 is arranged as a coarse surface.

Even in the second and third embodiments shown in FIGS. 7 and 8, in which not all of the surfaces of the convex portions but only one part thereof is arranged to be coarsened, an effect that prevents to produce a stripe pattern can be obtained.

Figure 9:
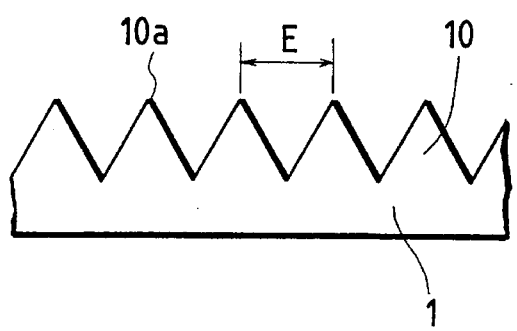

FIG. 9 is a schematic view depicting a fourth embodiment of the transparent member according to the present invention. In this embodiment, a distance between each convex portion (pitch length) formed on the transparent member 1 is specified to be 0.1 mm or less, more preferably 0.05 mm or less.

Figure 10:
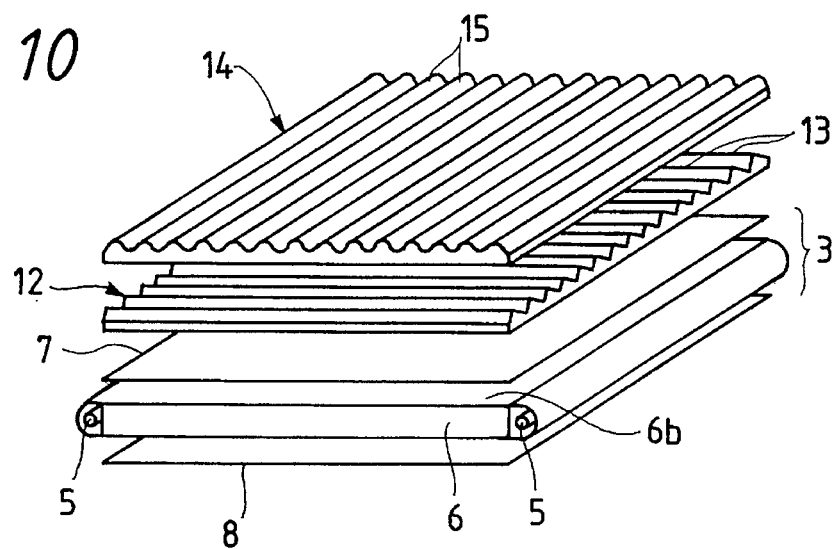
FIG. 10 is a schematic view depicting a surface light source device in which a fifth embodiment of a transparent member according to the present invention is used.

FIG. 10 is a schematic view representing a fifth embodiment of the transparent member according to the present invention. In this embodiment, the transparent member is arranged as a unit; and the unit comprises two transparent prism plates or prism sheets each of which has a multiplicity of prism-like convex portions formed on one of the surfaces thereof. That is to say, the unit comprises a first prism plate or a first prism sheet 12 having a multiplicity of convex portions 13 with their cornered top portions and a second prism plate or a second prism sheet 14 having a multiplicity of convex portions 15 with their round top portions; these first and second prism plates or sheets 13 are arranged such that the longitudinal direction of the cornered tops of the convex portions 13 of the first prism plate or sheet 12 intersects the longitudinal direction of the round tops of the convex portions 15 of the second prism plate or sheet 14.

When the transparent member unit (a combination of the first prism plate or sheet 12 and the second prism plate or sheet 14) according to the fifth embodiment is used to be disposed on the light emitting surface side of the surface light source device 3 to illuminate the liquid crystal display panel 4, not only an observation from the direction perpendicular to the liquid crystal display panel but also an observation from the direction perspective to the panel can be obtained with a bright image.

Figure 11:
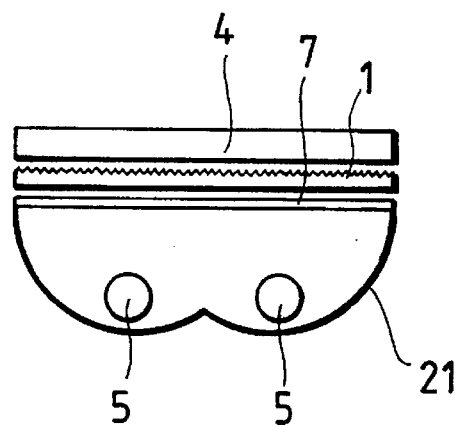
FIG. 11 is a schematic view illustrating a construction of a surface light source device using a reflection member.

The above-explained transparent member unit according to the present invention can be also used in a surface light source device having a reflection member as shown in FIG. 11 as well as in the surface light source device having a light conducting member.

In such surface light source device, a single or a plurality of light source(s) are arranged inside of the reflection plate 21 (light reflecting surface); and a diffusion plate 7 is disposed on the light emitting surface side of the device. The transparent member unit 1 according to the present invention may be used to be disposed between the surface light source device and a liquid crystal display panel 4. Any transparent member units shown in FIGS. 6, 7, 8, 9 and 10 can be used in the surface light source device utilizing a reflection plate as shown in FIG. 11.

Figure 1:
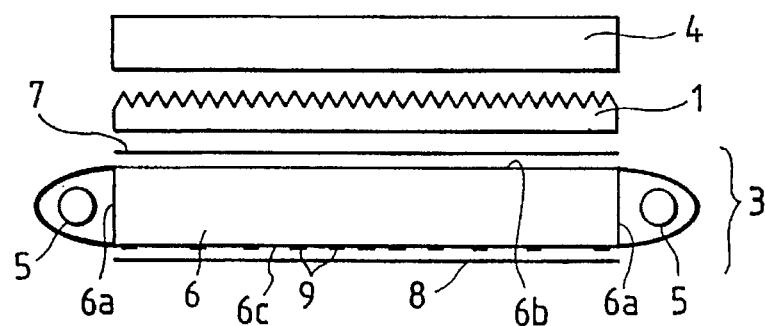
FIG. 1 is a schematic view showing a construction of a conventional surface light source device having a prism sheet which is used to illuminate a liquid crystal display device.

The surface light source device using the transparent member units (the prism plate or the prism sheet having a multiplicity of prism-like portions) according to the present invention has its construction shown in FIG. 1 or FIG. 11, in which a diffusion plate is disposed on a light emit ting surface side thereof. The diffusion plate comprises a transparent plane plate or a transparent sheet and a light diffusing material is applied on one of the surfaces thereof. However, the other diffusion plate can be also used in the device, which is manufactured in such a manner that an ink including a foam material is printed on a surface of a plate or sheet, then a heat is added to the plate or sheet in order to vesicate the foam material, and a heat is further added to the plate or sheet to make it dry and the ink harden. The diffusion plate manufactured in this manner serves to diffuse the light with the aid of a multiplicity of fine foams produced in the hardened ink.

When the light emitted from the light emitting surface of the surface light source device passes through the diffusion plate or sheet, the light is diffused in a uniform manner. However, if the amount of the emitting light being arrived to the surface of the diffusion plate or sheet, the brightness distribution does not become uniform on the surface of the diffusion plate or sheet.

For instance, in case of the surface light source having a light conducting member, the amount of light emitted from the light emitting surface of the light conducting member is greater on the side(s) close to the light source(s) but it decreases as farther from the light source(s). On the other hand, on the light emitting surface of the light conducting member, a greater amount of light having an angle almost perpendicular to the light emitting surface is emitted from the area which is closer to the light source(s), but an emitting light having an inclined angle with respect to the light emitting surface becomes greater as farther from the light source(s). Particularly, a great amount of light having an angle inclined toward a direction opposite to the light source(s) is emitted from the area.

As stated in the above, the amount of light emitted from the light emitting surface of the light conducting member is greater as closer to the light source(s) and becomes smaller as farther from the light source(s), Further, out of the emitting light emitted from the light emitting surface of the light conducting member, the amount of light directed to a perpendicular direction with respect to the light emitting surface is smaller in the area as farther from the light source but the amount of light inclined with respect to the light emitting surface and in the direction opposite to the light source(s) is greater in this area.

Therefore, by directing the light, whose amount is comparatively large, directed in the perspective direction out of the light emitted from the area where farther from the light source to the perpendicular direction with respect the light emitting surface, it can be prevent that the amount of light emitted from the surface light source device is decreased.

When changing the direction of the part of the light directed in the perspective direction, which is emitted from the area far from the light source(s), to the direction perpendicular to the light emitting surface, the brightness in the area in an almost perpendicular direction can be increased.

Figure 12:
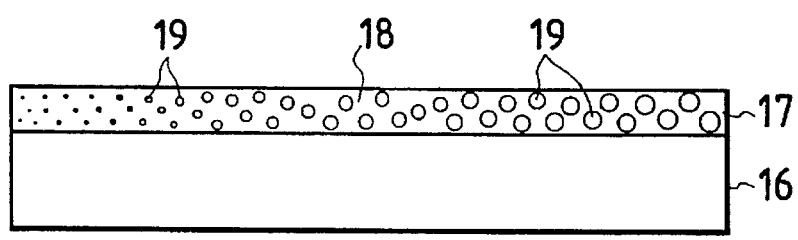
FIGS. 12 and 13 are schematic views representing constructions of diffusion plates for use in surface light source devices.

For the above reason, a bright and uniform surface light source device using a light conducting member can be obtained by taking the construction of the diffusing plate as shown in FIG. 12 into the device. In FIG. 12, the numerical reference 15 represents a transparent sheet or a transparent plate, and 16 a diffusing material made of a transparent ink 17 including glass beads or hollowed grains 18 in a breaking up condition. As shown in FIG. 12, the diffusing material 16 is arranged such that the diameters of the glass beads or hollowed grains 18 included therein are smaller in the left side, i.e. a light source side and becomes greater as moved to the right side, i.e. farther from the light source. Therefore, the light diffusing effect is smaller in the left side and becomes greater as moved to the right side. By such an arrangement, a uniform brightness can be obtained for the reason as stated in the above. It should be noted that the diameter of the glass beads, etc. to be included in the diffusing material should be 10 micrometer or less.

Figure 13:
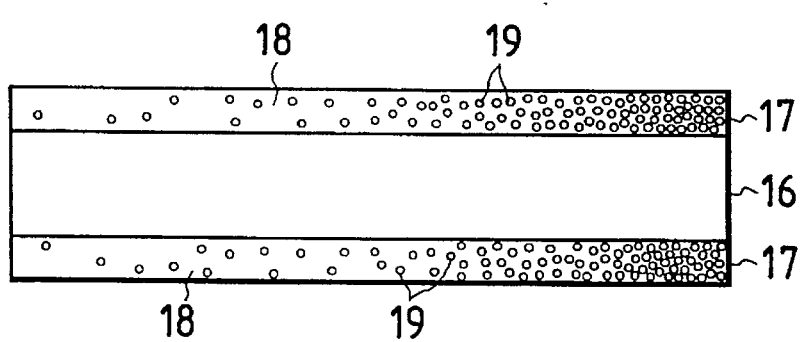

In FIG. 13, another transparent sheet or transparent plate 15 is illustrated, in which the diffusing material 16 is applied on both surfaces thereof. In this case, the diffusing material 16 is arranged such that the density of the glass beads 18 is smaller in the left side and becomes greater as moved to the right side. Therefore, the diffusing effect is smaller in the left side and becomes larger as moved to the right side. It should be noted that the glass beads 18 have the same diameters.

The diffusing plates shown in FIG. 12 and 13 can be applied to not only the surface light source device using a light conducting member, but also another surface light source device such as the device using a light reflecting member. That is to say, in case that an unevenness of brightness is caused on the light diffusing plate, particularly dark portion(s) are locationally caused by the reason that most of light emitted from the light conducting member is directed to the perpendicular direction and therefore most of the light does not contribute to illuminate an object, the diffusing effect in the dark portion(s) can be improved by using the above mentioned means to obtain a uniform brightness distribution.

What is claimed is:

1. A surface light source device, comprising:

a light source, a flat light emitting surface for emitting a light generated from said light source, and a prismatic member;

said prismatic member having a multiplicity of convex portions which have triangular cross sections, and extend parallel to each other on at least one of the surfaces thereof, at least one surface portion of each of said convex portions being coarsened; and said prismatic member being arranged on said light emitting surface.

2. A surface light source device according to claim 1, wherein said prismatic member has a sheet-like shape.

3. A surface light source device according to claim 1 wherein said prismatic member has a plate-like shape.

4. A surface light source device according to any one of claims 1 to 3, wherein each of said convex portions having a triangular cross section comprises a pair of surfaces, and said coarsened surface portion is arranged on one of said pair of surfaces.

5. A surface light source device according to any one of claims 1 to 3, wherein each of said convex portions having a triangular cross section comprises an apical portion, and said coarsened surface is only provided in the vicinity of said apical portion.

6. A surface light source device according to anyone of claims 1 to 3, wherein said cross section of each convex portion has an equilateral triangle shape.

7. A surface light source comprising:

a light source, a light conducting member having a light emitting surface from which light generated from said light source is emitted, a first transparent prismatic member, and a second transparent prismatic member;

said first transparent prismatic member having a multiplicity of convex portions having triangular cross sections and extending parallel to each other in a longitudinal direction; and said second transparent prismatic member having a multiplicity of convex portions having semi-circular cross sections and extending parallel to each other in a second longitudinal direction;

wherein said first prismatic member and said second prismatic member are superimposed on each other and arranged on said light emitting surface of the light conducting member such that longitudinal directions of said convex portions of the first and second prismatic members intersect with each other.

* * * * *